UNITED STATES PATENT OFFICE.

LUDWIG BRUMLEN, OF HOBOKEN, NEW JERSEY.

IMPROVEMENT IN PROCESSES FOR MANUFACTURING VERDIGRIS.

Specification forming part of Letters Patent No. 18,133, dated September 8, 1857.

*To all whom it may concern:*

Be it known that I, LUDWIG BRUMLEN, of Hoboken, in the State of New Jersey, have invented a new and Improved Mode of Manufacturing Verdigris and other Colors, as Paris-Green and Chrome-Yellow; and I do hereby declare that the following is a full and exact description thereof.

To manufacture the crystallized verdigris I take the refuse liquid from chrome-yellow after this article is struck down from a solution of lead in acetic acid by bichromate of potash, or the remaining liquid from white lead after it is struck down from a solution of lead in acetic acid by soda or potash; or, in case I have none of these refuse liquids I neutralize vinegar by soda, or potash, or pearlash, and evaporate these different liquids to such an extent that one gallon contains five or six pounds of dry acetate of soda or acetate of potash, or both mixed in solution. This is easy to ascertain by a hydrometer of Twaddle, according to which the condensed liquid, when 140° warm, contains five pounds in solution when the hydrometer shows 28°, or six pounds when it shows 34°. I then put into a sufficiently-large tub or tank blue vitriol in such a proportion that one hundred and ten pounds of it come to every one hundred pounds of acetate of soda or potash, and let the condensed hot liquid containing the acetate of soda or potash run over the vitriol, constantly stirring it up, so to bring it in constant contact with the acetate of soda or potash to precipitate the verdigris which will settle at the bottom of the tank. When all the vitriol is decomposed and the verdigris settled the liquid standing over it is drawn off and used as hereinafter will be described. This liquid contains a great quantity of verdigris in solution, cannot, however, be used for it again on account of the great quantity of sulphate of soda or potash it contains, and has therefore to be used either for manufacturing paris-green with it or to be decomposed again to get the ingredients back again in the shape of blue vitriol and acetate of soda. The verdigris in the tank is then washed out with clear water, and then taken out to be dried in order to have it ready for the market.

To use the refuse liquid from the verdigris for paris-green, I follow the following process: White powdered arsenic is dissolved in soda and water and the clear solution mixed with a solution of blue vitriol, after which I add of the refuse liquid from verdigris, let the whole stand still for thirty minutes, and then stir it up every twenty minutes till the paris-green is completely formed, which will be the case in about two hours. The liquid over the paris-green contains now still much paris-green and acetate of soda in solution, and, neutralized by a solution of soda and arsenic, precipitates still paris-green of an inferior but still very good quality, leaving acetate of soda in solution. This last refuse liquid from paris-green consists now almost entirely of sulphate of soda and acetate of soda, and is therefore worth saving in order to get the acetate of soda again to be used for verdigris. To effect this I use this last refuse liquid to dissolve bichromate of potash in it, to precipitate with it chrome yellow from a solution of lead in vinegar. The remaining liquid from the chrome yellow is then again used for verdigris, as already stated.

The proportions for paris-green cannot be exactly given, because they depend much on the degree of heat employed or on the quantity of water used for the solutions of arsenic and vitriol. I use four hundred to four hundred and forty pounds blue vitriol to three hundred and twenty to three hundred and forty pounds of arsenic and soda-ash, according to its strength, just enough to neutralize the vitriol. Of refuse liquid from verdigris I take to the above named proportions of vitriol and arsenic from one hundred and eighty to two hundred gallons, according to its strength. Should that not be sufficient, I add vinegar enough to form the paris-green.

In order to use the refuse liquid from verdigris again for manufacturing verdigris of it, and not to be compelled to make paris-green, I neutralize the same by hydrate of lime, which by double affinity will decompose the acetate of copper contained in the liquid to oxide of copper and acetate of lime. The sulphate of soda contained in the liquid will at the same time decompose again the acetate of lime to sulphate of lime and acetate of soda, so that the original verdigris liquid is now decomposed to oxide of copper mixed with much sulphate of lime, and to acetate of soda mixed with sulphate of soda. The former I use for blue vitriol by dissolving the oxide of copper in sulphuric acid, and crystallization, leaving the sulphate of a lime as a refuse, good for nothing. The latter—that is, the clear solution of acetate of soda and sulphate of soda—has then to be purified from all sulphate of soda by a further addition of acetate of lime sufficient to turn all the sulphate of soda into acetate of soda and sulphate of lime, which is almost insoluble, and will settle at the bottom, leaving the acetate of soda in solution, to be evaporated and used for verdigris in the manner already described.

In order to be sure that all sulphate of soda is decomposed by acetate of lime, it is good to take ample of the latter and then add of a clear solution of soda till a further addition of the latter will not precipitate any carbonate of lime, which will be the case as long as the liquid contains any acetate of lime. This mode of using the refuse liquid from verdigris again for the same article leaves it entirely to the option of the manufacturer to use either of the two ways described as it may best suit him.

I claim now as my invention—

1. To use all these refuse liquids from chrome-yellow and white lead to make verdigris of them.

2. To use the remaining liquid from verdigris to make paris-green of.

3. To use the remaining liquid from paris-green again for making chrome-yellow.

4. To use the refuse liquid from verdigris again for verdigris, in the manner described.

5. The manufacture of verdigris, paris-green, and chrome-yellow from the different waste liquids specified, in the manner substantially as described.

LUDWIG BRUMLEN.

Witnesses:
FRED. HEYNE,
WM. RÜGER.